Jan. 19, 1965   R. T. COFFMAN   3,166,136
APPARATUS FOR WEIGHING MATERIAL IN A SEALED ENCLOSURE
Filed July 12, 1963   2 Sheets-Sheet 1
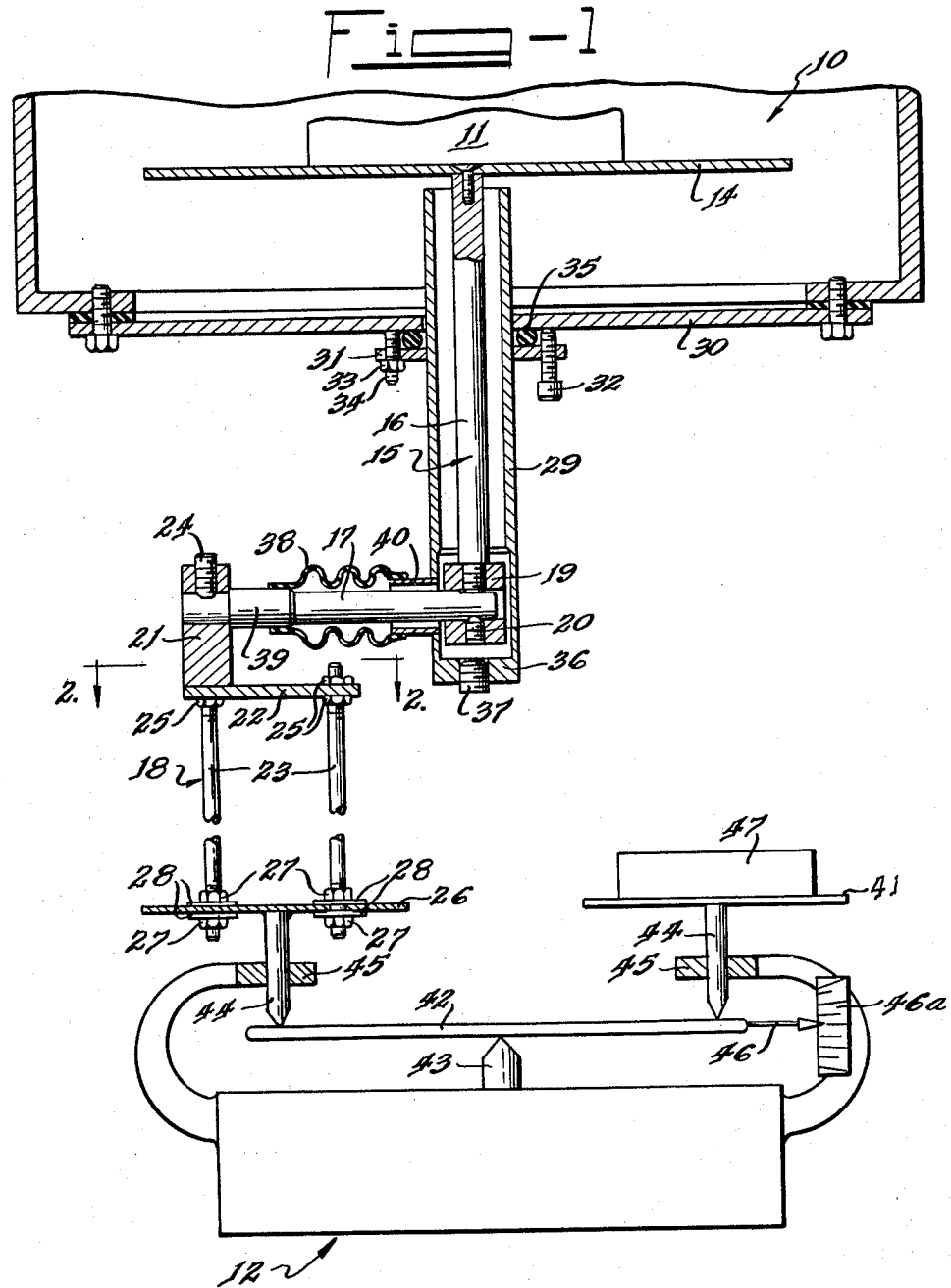
INVENTOR.
Raphael T. Coffman
BY
Roland A. Anderson
Attorney Jan. 19, 1965    R. T. COFFMAN    3,166,136
APPARATUS FOR WEIGHING MATERIAL IN A SEALED ENCLOSURE
Filed July 12, 1963    2 Sheets-Sheet 2
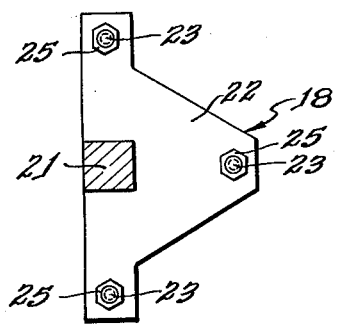
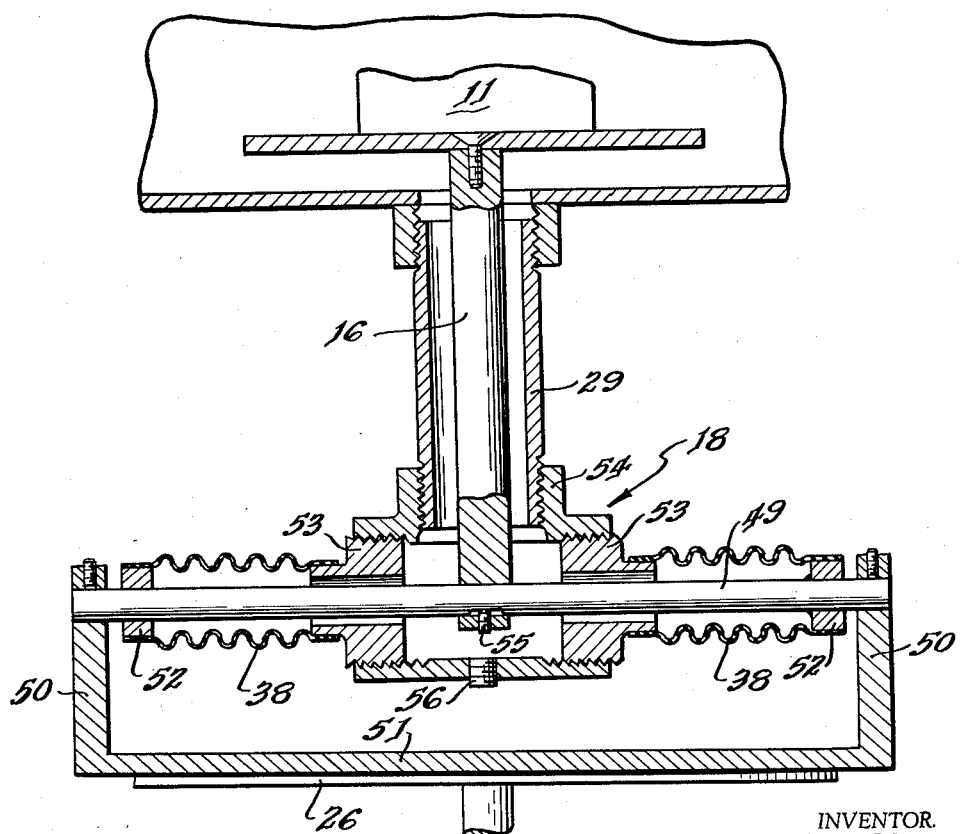
INVENTOR.
Raphael T. Coffman
BY
Roland A. Anderson
Attorney

United States Patent Office 3,166,136
Patented Jan. 19, 1965

3,166,136
APPARATUS FOR WEIGHING MATERIAL
IN A SEALED ENCLOSURE
Raphael T. Coffman, Richland, Wash., assignor to the United States of America as represented by the United States Atomic Energy Commission
Filed July 12, 1963, Ser. No. 294,775
3 Claims. (Cl. 177—262)

This invention relates to the weighing of material or objects in a sealed enclosure. More specifically the invention relates to a seal construction that enables a mass in a large sealed compartment to be weighed by a weighing apparatus located outside the compartment.

It is customary in the handling of materials such as plutonium in an enclosure for the gas pressure to be kept higher outside the enclosure than inside. This arrangement insures that any leakage through the enclosure will be from outside to inside of the enclosure, and thus that contaminants will not escape from the enclosure. The pressure difference adversely affects the accuracy of a weighing apparatus external to the enclosure.

The present invention provides, in conjunction with a movable force transmitter leading from the interior to the exterior of the sealed enclosure, a seal construction that balances out the pressure differences between the exterior and intrior of the enclosure as well as offering substantially no resistance to movement of the force transmitter. At the same time the sealing action is positive, since it is not produced directly between relatively movable parts.

In the drawing:

FIG. 1 is an elevation, partly sectional, of one embodiment of the present invention;

FIG. 2 is a sectional view taken on the line 2—2 of FIG. 1; and

FIG. 3 is a sectional elevation of a modified embodiment of the invention.

As shown in FIG. 1, a sealed enclosure or hood 10 is provided, in which a material such as plutonium is handled or processed in an inert atmosphere of argon or helium at a pressure lower than atmospheric pressure. The present invention about to be described enables a mass 11 of plutonium or the like within the enclosure 10 to be weighed on a weighing apparatus 12 which is outside the enclosure 10.

The mass 11 rests on a pan 14 which is supported in the upper end of a force transmitter 15, which is an essential feature of the invention. The force transmitter comprises a central longitudinal member 16, a transverse member 17, and an offset longitudinal structure 18. The longitudinal member 16 is vertical and has its upper end attached to the pan 14. The transverse member 17 projects horizontal from the lower end of the member 16 to the upper end of the structure 18.

The lower end of the central member 16 has threaded engagement with a hole in an adapter ring 19 and abuts a flat region on the transverse member 17. The adapter ring 19 is retained on one end of the member 17 by a screw 20 having threaded engagement with a hole in the adapter ring and extends into a recess in the member 17.

As shown in FIGS. 1 and 2, the structure 18 comprises a post 21, a plate 22, and three spaced parallel vertical rods 23. The post 21 is secured to one end of the transverse member 17, which is fixed in an opening in the post by a screw 24 having threaded engagement with an opening in the post and extending into a recess in the transverse member. As is evident from FIG. 2, the axes of the rods 23 intersect a plane perpendicular thereto at points lying at the corners of a triangle. The plate 22 is welded to the post 21. The upper ends of the rods 23 extend through the plate 22 and are secured thereto by nuts 25 engaging opposite sides of the plate 22 and having threaded engagement with the rods 23. The lower ends of the rods 23 extend through a scale pan 26 of the weighing apparatus 12 and are secured to the pan by nuts 27 which have threaded engagement with the lower ends of the rods 23 and press against washers 28 located at opposite sides of the pan to clamp the pan between the washers.

The central longitudinal member 16 of the force transmitter 15 projects freely through a vertical tubular part 29, which extends through, and is sealed to, a bottom plate 30 forming part of the enclosure 10. The tubular part 29 carries a flange 31, which is secured to the bottom plate 30 by screws 32, threaded posts 33, and nuts 34 thereon. Only one of each of screws 32, posts 33, and nuts 34 is shown in FIG. 1, but it will be understood that there are four of each, distributed in a ring about the tubular part 29. The screws 32 are threaded through the flange 31 and abut the bottom plate 30. The posts 33 are secured to the bottom plate 30 and extend freely through the flange 31. The nuts 34 are adjusted on the posts 33 against the flange 31 to make the screws 32 abut the bottom plate 30. The adjustment of the screws 31 determines the clamping pressure applied to an O-ring seal 35 by the bottom plate 30 and the flange 31. The lower end of the tubular part 29 is closed by a disk 36 welded thereto. A plug 37 in a threaded opening in the disk 36 may be removed therefrom for access to the screw 20 in the adapter ring 19.

As an essential part of the invention, a hollow yieldable element 38 which offers no resistance to lateral distortion loosely encloses the transverse member 17 of the force transmitter 15. The hollow element 38 may be formed of soft neoprene rubber and be of the expanso-contractable bellows type as shown in FIG. 1. One end of the hollow element 38 is sealed by bonding or cementing to a shoulder 39 on the transverse member 17, and the other end, to a transverse tubular flange 40 attached at a side opening in the tubular part 29 near its lower end.

The weighing apparatus 12 as illustrated is of the balance type and comprises the previously mentioned pan 26, a pan 41, a beam 42, and a fulcrum 43. The pans 26 and 41 have supports 44, which are held vertical by bearing guides 45 in which they slide. The lower ends of supports 44 are formed as knife edges that engage the beam 42. Horizontal position of the beam 42 is checked by the position of a pointer 46 on one end of the beam on a scale 46a. A suitable weight 47 is placed on the pan 41 to balance the mass 11 to be weighed in the enclosure 10.

The significant thing about the present invention is that the axis of the hollow element 38 is horizontal and thus transverse to the vertical motion of the weighing operation. Thus, any movement caused by a change in the pressure difference between the exterior and interior of the enclosure 10 is horizontal and without effect on the vertical weighing motion. Thus, there is no interference with weighing accuracy. At the same time, the element 38, having a horizontal axis and being of elastic material such as soft rubber, offers substantially no resistance to vertical movement of the force transmitter 15 with respect to the enclosure 10 and tubular part 29, which movement can occur during the weighing operation.

The modification of FIG. 3 employs a force transmitter 48 having a transverse member 49 extending horizontally through and in both directions from the lower end of the central longitudinal member 16 and two offset longitudinal members 50 attached to the ends of the transverse member 49. Thus, the force transmitter 48 need not be attached to the scale pan 26 as does the force transmitter 15 of FIGS. 1 and 2, but is provided with a plate 51 of considerable length and breadth which rests on the scale pan 26. The plate 51 is secured to the members 50. Since the transverse member 50 extends from both sides of the central longitudinal member 16, there are two hollow elements 38 enclosing the transverse member. The outer ends of the hollow elements 38 are sealed by bonding or cementing to rings 52 which are sealed by soldering or welding to the transverse member 49 near its outer ends. The inner ends of the hollow elements 38 are sealed by bonding or cementing to adapters 53, which are threaded into a T-fitting 54 and sealed thereto by soldering or welding. The T-fitting 54 has a threaded connection with the lower end of the vertical tubular part 29, to which it is sealed by soldering or welding. The transverse member 49 is secured to the longitudinal member 16 by a set screw 55, to which access is had through an opening in the fitting 54. This opening is normally closed by a threaded plug 56 sealed to the fitting by soldering or welding.

It will be understood that this invention is not to be limited to the details given herein, but that it may be modified within the scope of the appended claims.

What is claimed is:
1. In an assembly comprising
 (1) a sealed enclosure, and
 (2) a weighing apparatus external to the enclosure for weighing a mass in the enclosure; the combination therewith, of
 (3) a tubular part extending exteriorly of the enclosure and having one end open and sealed to an opening in the enclosure, the other end of the tubular part being closed, the tubular part being provided with a side opening adjacent the closed end,
 (4) an offset force transmitter comprising (a) a first longitudinal portion projecting from a force-receiving end in the enclosure freely through the tubular member, (b) a transverse portion projecting from the first longitudinal portion freely through the side opening in the tubular member, and (c) a second longitudinal portion extending from the transverse portion in transversely offset relation to the first longitudinal portion for engagement with the weighing apparatus, and
 (5) a hollow expanso-contractable element extending from the tubular part transversely thereto and loosely containing the transverse portion of the force transmitter, the element being sealed at one end to the side opening in the vertical tubular part and at its other end to the force transmitter.
2. In an assembly comprising
 (1) a sealed enclosure, and
 (2) a weighing apparatus having a scale pan and being external to the enclosure for weighing a mass in the enclosure; the combination therewith, of
 (3) a tubular part extending exteriorly of the enclosure and having one end open and sealed to an opening in the enclosure, the other end of the tubular part being closed, the tubular part being provided with a side opening adjacent the closed end,
 (4) An offset force transmitter comprising (a) a first longitudinal portion projecting from a force-receiving end in the enclosure freely through the tubular member, (b) a transverse portion projecting from the first longitudinal portion freely through the side opening in the tubular member, and (c) a second longitudinal portion extending from the transverse portion in transversely offset relation to the first longitudinal portion and including three spaced parallel rods secured to the scale pan, the axes of the rods intersacting a plane perpendicular thereto in points lying at the corners of a triangle, and
 (5) a hollow expanso-contractable element extending from the tubular part transversely thereto and loosely containing the transverse portion of the force transmitter, the element being sealed at one end to the side opening in the vertical tubular part and at its other end to the force transmitter.
3. In an assembly comprising
 (1) a sealed enclosure, and
 (2) a weighing apparatus external to the enclosure for weighing a mass in the enclosure; the combination therewith, of
 (3) a tubular part extending exteriorly of the enclosure and having one end open and sealed to an opening in the enclosure, the other end of the tubular part being closed, the tubular part being provided with two diametrally opposed side openings adjacent the closed end,
 (4) an offset force transmitter comprising (a) a central longitudinal portion projecting from a force-receiving end in the enclosure freely through the tubular part, (b) a transverse portion projecting in opposite directions from the longitudinal portion freely through the side openings in the tubular part, and (c) longitudinal offset portions extending from the ends of the transverse portion for engagement with the weighing apparatus, and
 (5) two hollow expanso-contractable elements extending in opposite directions from the tubular part transversely thereto and loosely containing the transverse portions of the force transmitter, the elements being sealed at their inner ends to the side openings in the tubular part and at their outer ends to the force transmitter.

References Cited by the Examiner
UNITED STATES PATENTS
2,975,115  3/61  Wigner et al. _____ 285—299
FOREIGN PATENTS
877,064  9/61  Great Britain.

LEO SMILOW, *Primary Examiner.*